United States Patent
Pilavdzic et al.

(10) Patent No.: US 6,854,971 B2
(45) Date of Patent: Feb. 15, 2005

(54) APPARATUS FOR RETAINING A HEATER ON AN INJECTION MOLDING NOZZLE

(75) Inventors: Jim Izudin Pilavdzic, Milton, VT (US); Charles Edward Farmer, South Burlington, VT (US); Stefan Von Buren, Colchester, VT (US); Thomas Andrew Lawrence, Burlington, VT (US)

(73) Assignee: Husky Injection Molding Systems Ltd. (CA)

( * ) Notice: Subject to any disclaimer, the term of this patent is extended or adjusted under 35 U.S.C. 154(b) by 174 days.

(21) Appl. No.: 10/289,879

(22) Filed: Nov. 7, 2002

(65) Prior Publication Data

US 2004/0091562 A1 May 13, 2004

(51) Int. Cl.[7] .............................................. B29C 45/20
(52) U.S. Cl. .................................. 425/549; 264/328.15
(58) Field of Search ....................... 425/549; 264/328.15

(56) References Cited

U.S. PATENT DOCUMENTS

| | | | |
|---|---|---|---|
| 5,360,333 A | 11/1994 | Schmidt | |
| 5,411,392 A | 5/1995 | Von Buren | |
| 5,973,296 A | 10/1999 | Juliano et al. | |
| 6,305,923 B1 | 10/2001 | Godwin et al. | |
| 6,341,954 B1 | 1/2002 | Godwin et al. | |
| 6,530,776 B1 * | 3/2003 | Pilavdzic et al. | 425/549 |
| 6,638,053 B2 * | 10/2003 | Gellert et al. | 425/549 |

FOREIGN PATENT DOCUMENTS

| WO | WO 01 98054 A | 12/2001 |
|---|---|---|
| WO | WO 02 058907 A | 8/2002 |

* cited by examiner

*Primary Examiner*—Tim Heitbrink
(74) *Attorney, Agent, or Firm*—Katten Muchin; Zavis Rosenman

(57) ABSTRACT

An apparatus for retaining a heater on an injection molding nozzle comprises a retaining body configured to fit around the injection molding nozzle. The retaining body has two flanges extending inward. One is configured to be received in a groove in the injection molding nozzle; the other is configured to be received in a groove in the heater. An axial slot allows the retaining body to elastically spread outward. The retaining body also has at least one aperture that receives a thermocouple. The aperture is preferably an elongated hole having an axis parallel to a longitudinal axis of the retaining body. Preferably the heater is a thick-film heater and the thermocouple is installed adjacent one on the resistive elements of the thick-film heater. When the resistive elements produce different heat levels, the thermocouple is preferably installed adjacent the resistive element that produces the greatest heat.

25 Claims, 5 Drawing Sheets

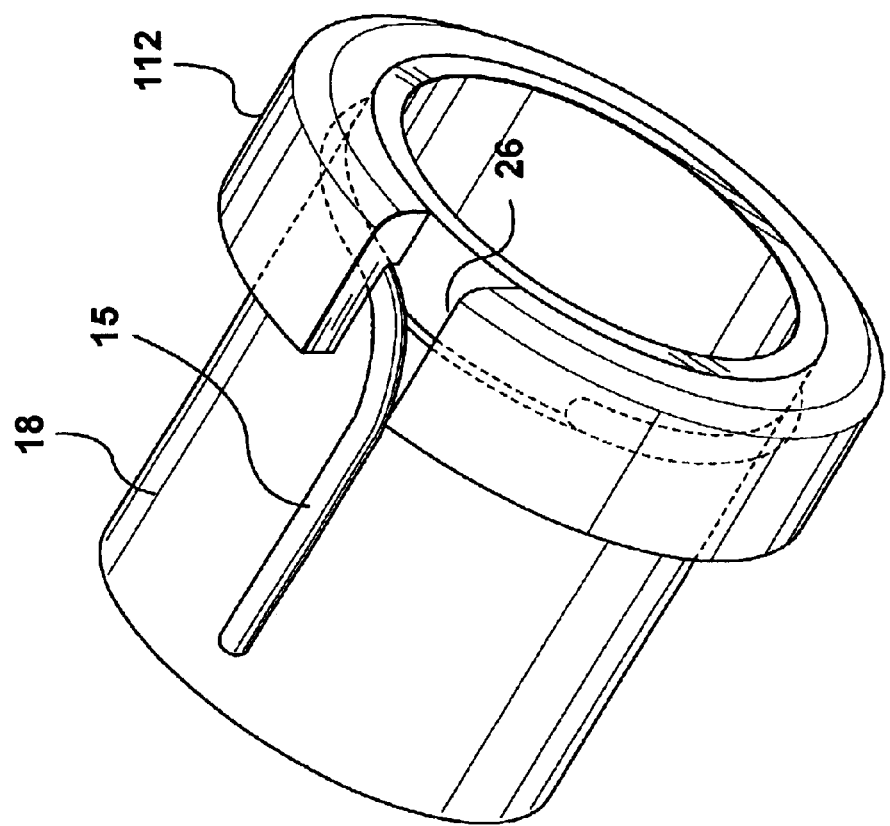
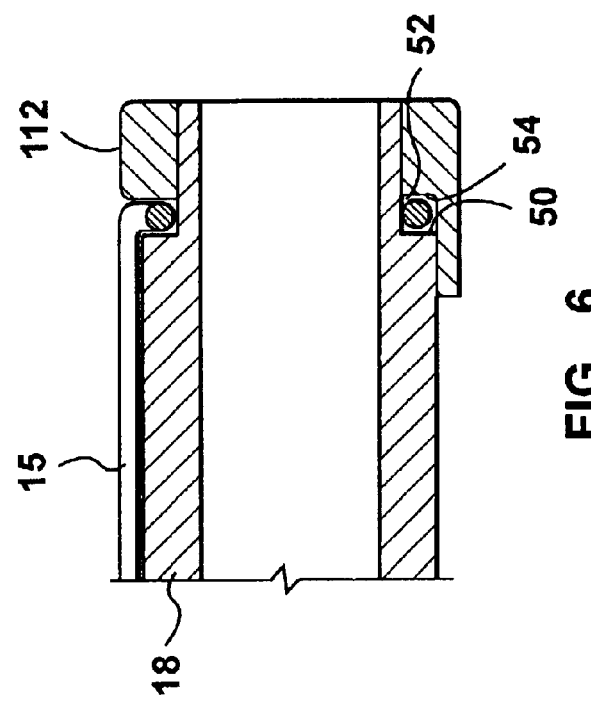

APPARATUS FOR RETAINING A HEATER ON AN INJECTION MOLDING NOZZLE

BACKGROUND OF INVENTION

1. Field of the Invention

This invention relates to an injection molding nozzle for use in conjunction with an injection molding machine, and especially (but not exclusively) in the context of a hot runner manifold. More specifically, the invention relates to a method and apparatus for controlling a thin heater with low thermal inertia and retaining it on, and in thermal contact with, a body, such as an injection molding nozzle.

2. Background Information

An injection molding apparatus may include a heated hot runner manifold for the distribution of a molten material to at least one injection nozzle. Each injection nozzle may be associated with one or more mold cavities, whereby the molten material is transferred to the mold cavity through a gate orifice located at a distal end of the nozzle. During an injection cycle, the gate orifice preferably may be selectively opened and closed to start and stop the flow of molten material to the respective mold cavity.

Typically, an injection molding nozzle will include a heater placed in contact with the exterior of the nozzle in many well known configurations. One such heater is a wire wound resistive heater that is sized to slip over the exterior diameter of the injection nozzle. To control the temperature of the molten material in the injection nozzle, a temperature controller is typically connected to the heater and a thermocouple placed in close proximity to the injection nozzle tip. Such thermocouples are typically installed in an aperture in the nozzle housing or tip retainer. An operator uses the temperature controller to select a temperature set point, and electrical power to the heater is varied by the temperature controller in accordance with the temperature set point and a signal from the thermocouple. It is well known in the prior art that the measured temperature as reported by the thermocouple can be significantly different from the actual temperature of the molten material in the nozzle. Operators typically must run trial and error experiments to determine the proper temperature set point for each new setup to reliably produce an injection molded part. These trial and error experiments can take considerable time and waste valuable resources.

Experiments have shown that in prior art nozzles, there exists a large thermal gradient along the length of the injection nozzle. Having a non-constant temperature along the length of the nozzle subjects the sometimes-sensitive resin to hot spots as it flows towards the mold cavity. These hot spots can degrade the resin and result in a low-quality molded part. Since plastics are often sensitive to temperature, degradation of the processed melt can also occur as a consequence of any errors in temperature measurement. In addition, these factors may cause the temperature operating window for a particular setup with a given resin to be very narrow. Experiments have shown that axial placement of the heater along the nozzle significantly impacts the thermal profile of the molten material in the nozzle, and position of the thermocouple relative to the heater dramatically affects the temperature reading it provides.

Ideally, it would be advantageous to provide a nozzle having constant temperature (isothermal) along its entire length, and in which a one degree difference in the set point temperature would result in a corresponding one degree difference in the nozzle temperature.

U.S. Pat. No. 5,360,333 to Schmidt and U.S. Pat. No. 5,411,392 to Von Buren (each incorporated herein by reference) both disclose means for clamping a wire-wound cartridge-type bi-metal heater to an injection nozzle using thermal expansion properties of the bimetallic heater to tightly clamp it against the nozzle when hot. However, these patents do not address axially positioning the heater relative to the nozzle, nor placement of a thermocouple relative to the heater or nozzle.

FIG. 7 illustrates how a heater disclosed in Schmidt is typically mounted on a nozzle assembly. In a cold condition, heater 202 can slide axially over nozzle subassembly 200 and is positioned as shown. A conventional retaining ring 204 is then installed in a circumferential groove 206 in nozzle subassembly 200 to prevent the heater 202 from moving toward tip 208. A thermocouple 210 is installed in an aperture 212 in heater 202, then cap 214 is screwed onto heater 202, with threads 216 engaging threads 218, to retain thermocouple 210 in aperture 212 and prevent heater 202 from moving axially. It should be noted that thermocouple 210 is placed adjacent one of the heat-producing elements 220 of heater 202 to provide a good indication of the temperature of the heater near the nozzle tip. Aperture 212 does not extend through heater 202 so that thermocouple does not touch the nozzle subassembly 200. This prevents damage to the thermocouple 210 when heater 202 with thermocouple 210 is removed from nozzle subassembly 200.

Recently, advances in heater technologies have produced film heaters that require much less space, less power and are more reliable than wire wound cartridge-type heaters. U.S. Pat. Nos. 5,973,296 to Juliano et al. 6,305,923 and U.S. Pat. No. 6,341,954 to Godwin et al. and U.S. patent application Ser. No. 09/596,549 (each incorporated herein by reference) disclose the current state of the art of film-based heater technology specifically adapted for use on injection molding machines and the like. However, due to the nature of the film resistive elements that have a very well-defined operating temperature window, the actual operating temperature of the film heater should be precisely controlled to avoid premature failure. Therefore, when measuring the temperature of a film heater, it is beneficial to place the thermocouple, or other temperature sensor, adjacent a heat producing element of the film heater. Because the substrate of film heaters is typically much thinner than that of the cartridge-type heaters, the technique for retaining a cartridge-type heater on the nozzle and mounting a thermocouple on it, as illustrated in FIG. 1, is not well suited to film heaters. If oriented similar to aperture 212, an aperture of sufficient length to properly engage a thermocouple in a film heater would go through the film heater substrate leaving the thermocouple end rubbing against the nozzle assembly, thereby making it susceptible to damage when the heater is removed. The thinner substrate of the film heater also makes threading it more problematic. A threaded connection is susceptible to becoming loose after numerous molding cycles, and if overtightened, it can also be difficult to unscrew after being heated. Accordingly, an improved apparatus for attaching a film heater to an injection molding nozzle, or the like, and measuring and controlling the temperature of the heater, and thus the nozzle, is required.

SUMMARY OF INVENTION

In a first aspect of the present invention, an apparatus is provided for retaining a heater on an injection molding nozzle subassembly. The apparatus comprises a retaining body having an inside diameter configured to fit around the injection molding nozzle subassembly. The retaining body has a first flange and a second flange. Both flanges extend inward. The first flange is configured to be received in a first groove in an exterior surface of the injection molding nozzle subassembly. The second flange is configured to be received in a second groove in the heater. The retaining body may have an axial slot allowing the retaining body to elastically spread outward.

In one embodiment, the retaining body has at least one aperture configured to receive a thermocouple. Preferably the at least one aperture is an elongated hole having an axis parallel to a longitudinal axis of the retaining body. When there are a plurality of apertures, the apertures may each have a unique depth; and a thermocouple installed in one of those apertures places the thermocouple at a desired axial location relative to the heater as determined by the depth of the aperture in which the thermocouple is installed.

A preferred embodiment of the invention further provides an injection molding nozzle assembly which comprises a nozzle subassembly including a nozzle housing and a nozzle tip coupled to the nozzle housing, a heater disposed around the nozzle subassembly, in use, to heat the nozzle sub assembly and a retaining body having a portion positively engaging the heater and a portion positively engaging the nozzle subassembly so that the heater is axially positioned and retained on the nozzle subassembly.

The nozzle subassembly may have a first circumferential groove and the portion of the retaining body engaging the tip retainer may be a first flange that extends inward and is received by the first groove. Preferably the first flange is wider than the first groove, and the first flange has a radiused end so that the first groove acts as a detent for the first flange as the retaining body is slid along the tip retainer. The nozzle subassembly may have a removable tip retainer that retains the tip against the nozzle housing, and the first circumferential groove may be in the tip retainer.

The heater may have a second circumferential groove and the portion of the retaining body engaging the heater may be a second flange that extends inward and is received by the second groove.

Preferably the heater is a thick-film heater. A thermocouple may be installed in the retaining body. The thermocouple is preferably installed adjacent one on the resistive elements of the thick-film heater. When the resistive elements produce different heat levels, the thermocouple is preferably installed adjacent the resistive element that produces the greatest heat.

Another aspect of the invention provides a thermocouple retention device for use on a film heater having a plurality of resistive elements. The device comprises a retaining body attached to the film heater. The retaining body typically has a feature configured to receive a thermocouple at a predetermined position that is adjacent a resistive element of the film heater. In one embodiment, the feature is an aperture in the retaining body. In another embodiment, the feature is a cavity formed between a shoulder in the retaining body and a shoulder in the heater.

BRIEF DESCRIPTION OF DRAWINGS

FIG. 5 is an isometric view of a heater with a thermocouple retainer of another preferred embodiment of the present invention.

FIG. 6 is a cross-sectional view of the embodiment illustrated in FIG. 5.

DETAILED DESCRIPTION

Figure 1:
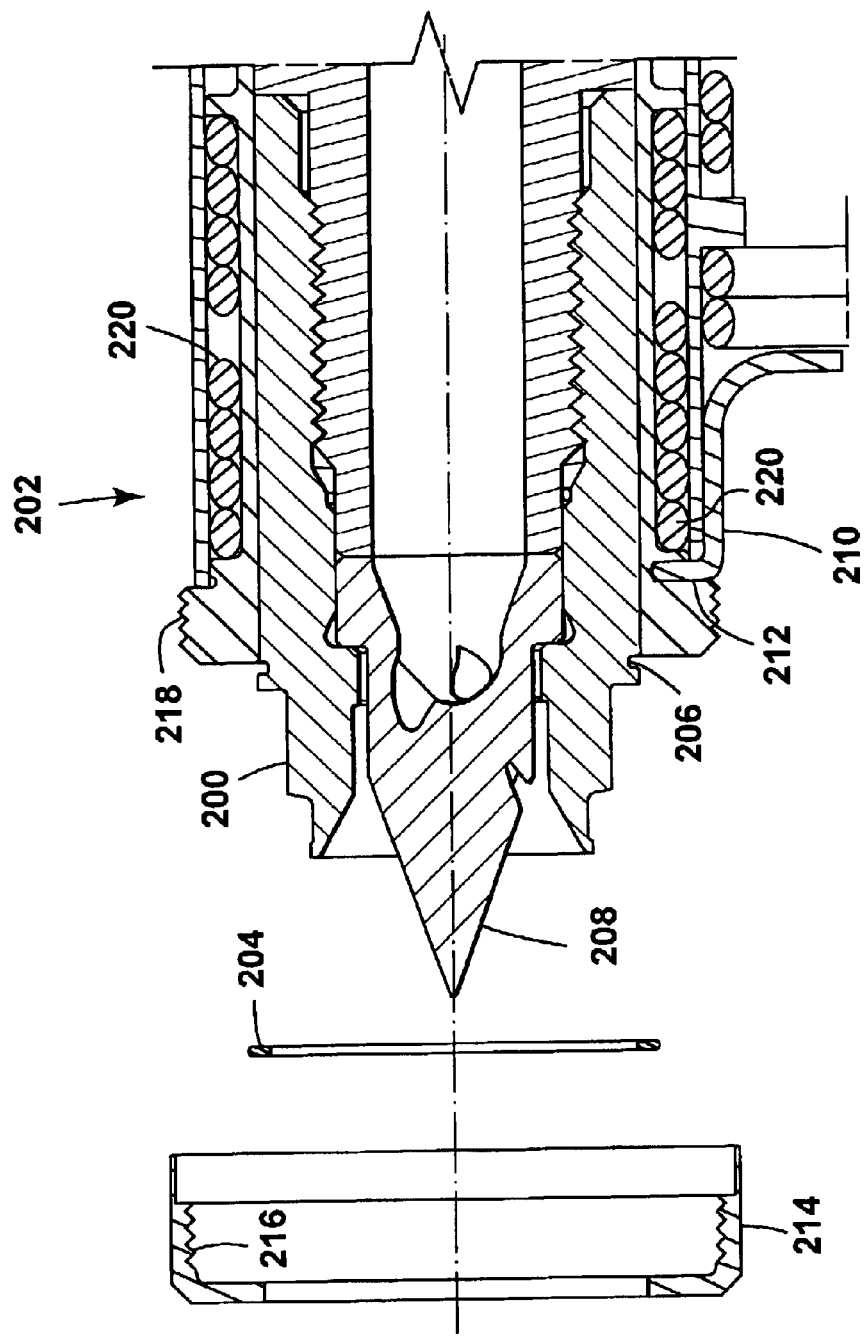
FIG. 1 is an exploded cross-sectional view of a prior art heater and thermocouple arrangement as they attach to an injection molding nozzle subassembly.
Figure 2:
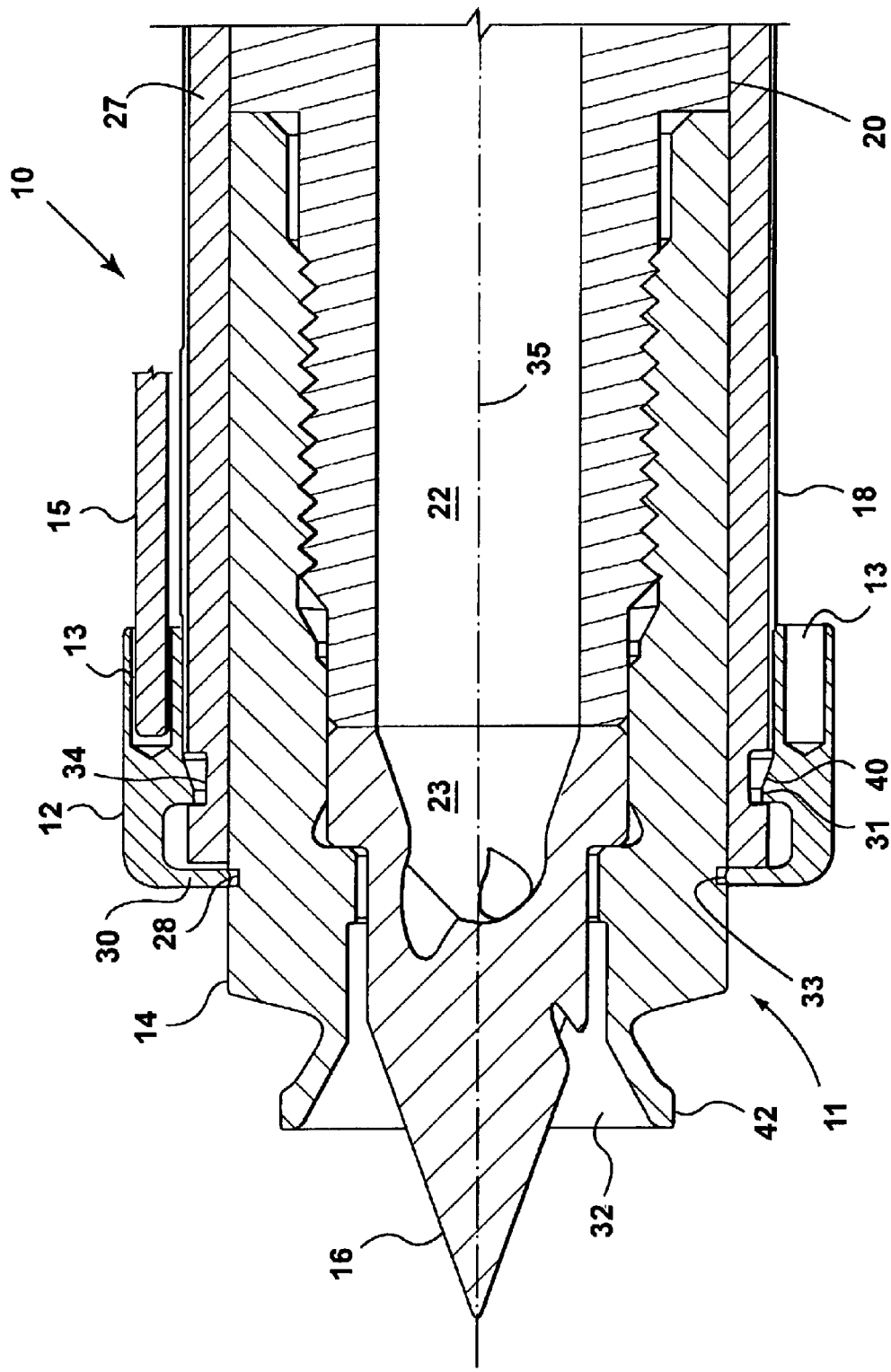
FIG. 2. is a cross sectional view of an injection molding nozzle assembly with a film heater and thermocouple installed in accordance with a preferred embodiment of the present invention.
Figure 3:
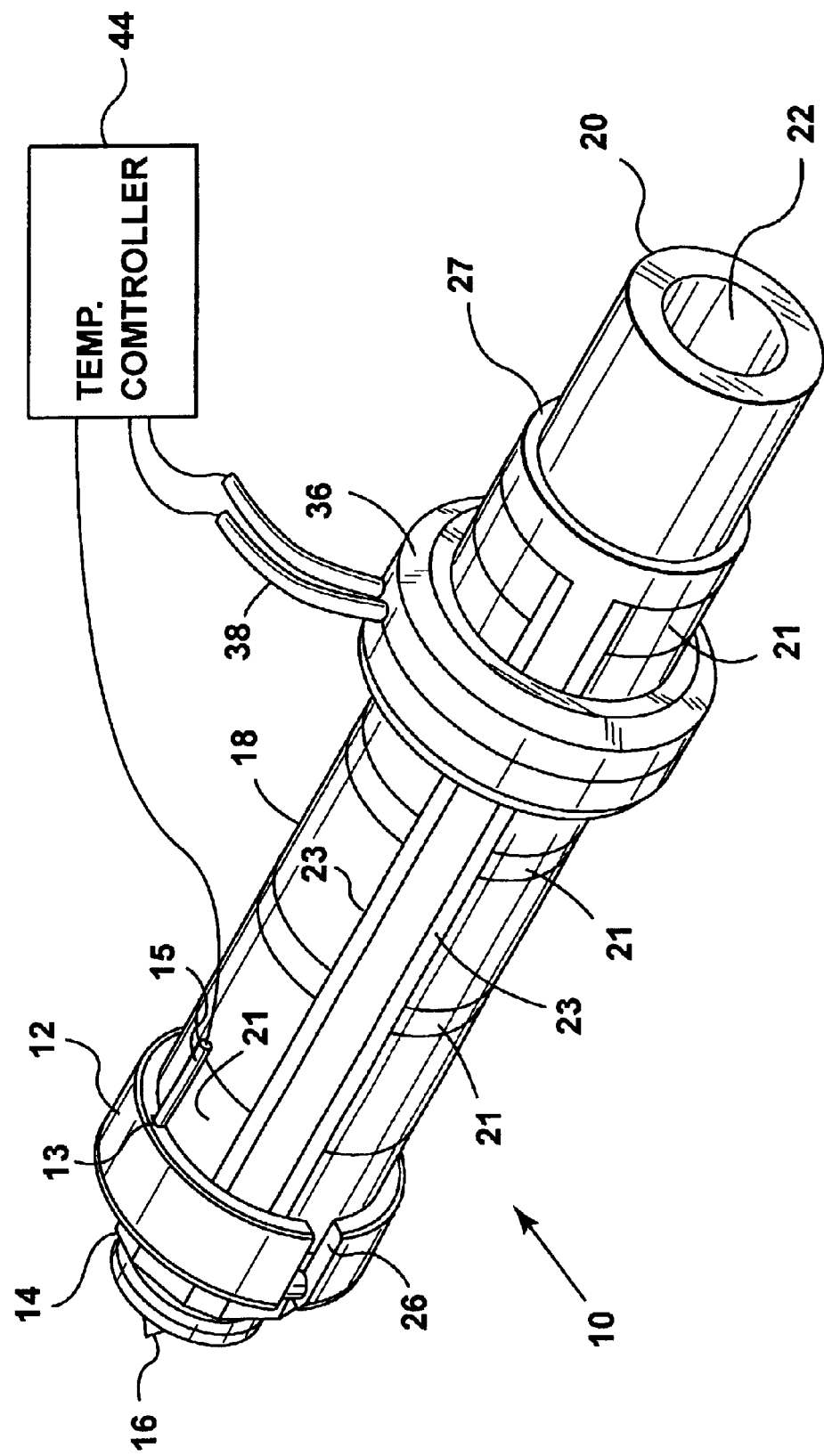
FIG. 3 is an isometric view of an injection molding nozzle assembly and temperature controller in accordance with a preferred embodiment of the present invention.

Referring to FIGS. 2 and 3, an injection molding nozzle subassembly 11 in accordance with a preferred embodiment of the present invention is generally shown. Nozzle subassembly 11 includes a nozzle subassembly 11 with a heater 18 installed on it, and the heater 18 is retained on the nozzle subassembly 11 by a retaining body 12. Preferably, a thermocouple 15 is installed in retaining body 12.

The injection nozzle subassembly 11 includes an elongated nozzle housing 20 having a melt channel 22 that is in fluid communication with a source of pressurized molten material (not shown) in a well known manner. At the proximal end of the nozzle housing 20 is a tip 16 with a tip channel 23 in fluid communication with the melt channel 22. Preferably, tip 16 is removably retained against the nozzle housing 20 by a tip retainer 14 that is removably affixed to the nozzle housing 20. In the preferred embodiment shown, the tip retainer 14 is threaded onto external threads formed on a surface of the nozzle housing 20, and tip retainer 14 and nozzle housing 20 are cylindrical in cross section with substantially equal outside diameters so that heater 18 smoothly slides over both nozzle housing 20 and tip retainer 14 with a close fit. Alternatively, the tip retainer may thread into internal threads in the nozzle housing 20, and nozzle housing 20 may have an external surface that extends along the entire length of heater 18, and onto which retaining body 12 engages. Alternatively, the retainer 14 and tip 16 may be unitized, such as by welding or brazing, or formed from a single piece of material. It should be noted, that one of ordinary skill in the art is familiar with a myriad of nozzle housing/tip/retainer configurations that make up nozzle subassembly 11 and may include a bubble area 32 formed between a seal-off flange 42 (that protrudes from the tip retainer 14) and the nozzle tip 16. The present invention is not limited to the one configuration shown and described herein, but contemplates application to all known nozzle assembly configurations.

A heater 18 is mounted on injection nozzle subassembly 11 such that it surrounds a majority of nozzle subassembly 11. In the preferred embodiment shown, and not by limitation, the heater 18 is shaped and sized to slip over nozzle subassembly 11. For the sake of explanation only, it is assumed that the nozzle subassembly 11 and, hence, the heater 18, are substantially cylindrical in cross section. Heater 18 provides heat energy to the nozzle subassembly 11 which conducts the heat to the molten material in melt channel 22 to maintain the molten material in a molten state. A temperature controller 44 (shown in FIG. 3) controls the power to heater 18 through known feedback control methods using a thermocouple 15 or other temperature sensing device.

Figure 4:
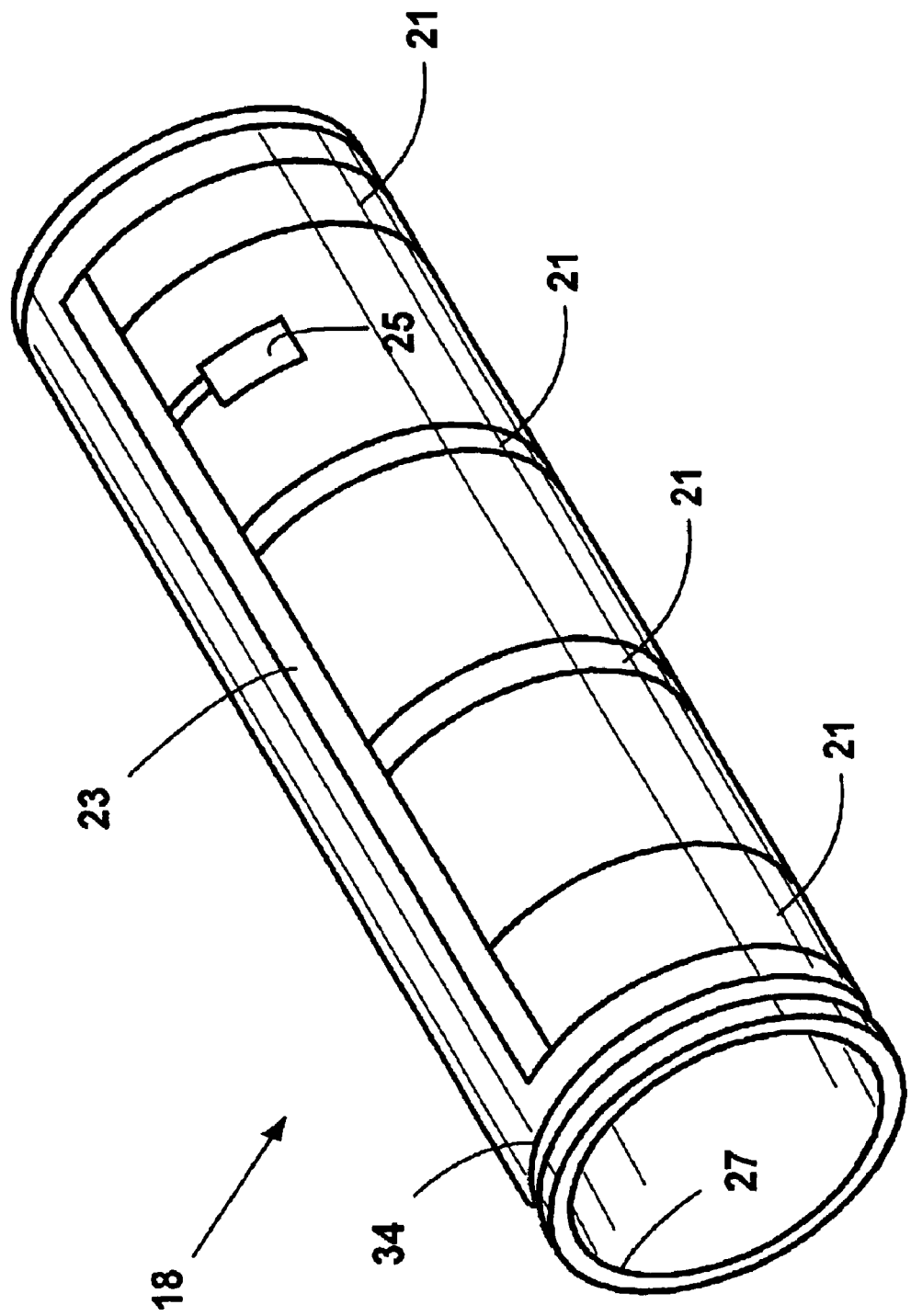
FIG. 4 is an isometric view of a film heater illustrating resistive traces on it.

Referring also to FIG. 4, in the preferred embodiment illustrated, the heater 18 includes a suitably (e.g. cylindrically) shaped hollow substrate 27 with a surface on which thick-film printed layers are formed, and is referred to as a thick-film heater. The thick-film heater has preferably two conductive elements 23 to which a plurality of circumferential resistive elements 21 are connected at predetermined axial spacing to produce a desired thermal profile along the heater 18 when electrical power is provided to the heater 18 through wires 38 which are coupled to the temperature controller 44 and attached to pads 25 in electrical communication with conductive elements 23. The spacing and size of resistive elements 21 are such that heating is preferably uniform along the melt channel 22 and the temperature of the molten material can, therefore, be kept substantially constant. The resistive elements 21, conductive elements 23, and pads 25 preferably are all printed thick-film traces.

A connector housing 36 (FIG. 3) is provided on heater 18 to secure the connection of wires 38 to thick-film pads 25 of the heater 18 and to provide strain relief to the wire connections. In the preferred embodiment shown, the connector housing 36 is an assembly of two annular pieces sized to fit over the heater 18.

As will be understood, the temperature controller 44 operates to provide a predetermined control signal to the heater 18 to produce a proportional amount of heat energy. Varying the signal supplied to the heater 18 will vary the amount of heat energy produced, thereby maintaining the molten material at a desired temperature for processing.

It has been observed in experiments, that the accurate placement and positive retention of the heater 18 and/or the thermocouple 15 in a well defined and reliable manner relative to the injection nozzle subassembly 11 produce significant benefits due to a more reliable and repeatable temperature reading from the thermocouple. In this respect, improved melt temperature uniformity within the injection nozzle as well as along the nozzle has been achieved, which allows a larger processing temperature window for a given plastic resin. Due to the more precise control and greater uniformity of the temperature of the molten material, it is also possible to process the material at a lower temperature, which helps to reduce cycle time and reduce the part cost due to less energy being used to produce the part. Uncontrolled gate drool or stringing has been also been eliminated through more reliable feedback and, hence, better operational control.

Because the preferred thick-film heater has very low thermal mass, placement of a thermocouple 15 in relation to the resistive elements 21 of a thick-film heater 18 has a profound effect on the accuracy of the temperature reading by the thermocouple 15 and provides a closer relationship between the temperature set point on the controller, the thermocouple reading, and the temperature of the melt channel 22. It is particularly advantageous to place the thermocouple 15 adjacent a resistive element 21 of a thick-film heater 18. This placement reduces the thermal resistance between the thermocouple 15 and the heat-producing element of the heater 18 and provides the most accurate and quickest temperature readings, which improves the thermal control of the nozzle subassembly 11 and prevents overheating of the heater 18. If the resistive elements 21 are different sizes so as to produce different heat levels, preferably the thermocouple 15 is located adjacent the resistive element that produces the greatest heat, which in this embodiment, is near the nozzle tip retainer 14.

In the embodiment, illustrated in FIGS. 2 and 3 (presently considered by the inventors to be the best mode), a conventional thermocouple 15 is mounted in retaining body 12 which also registers and retains the heater 18 on the nozzle subassembly 11. This allows a defective thermocouple or a defective heater to be easily replaced without replacing the non-defective part. The non-defective part can remain connected to the controller during replacement of the defective part. The retaining body 12 is disposed on an end of heater 18 adjacent the tip retainer 14. In the preferred embodiment shown, the retaining body 12 is a generally cylindrical metal collar configured to slip over the outside diameter of the nozzle housing 20 and, in this embodiment, over tip retainer 14. The retaining body 12 has a portion that positively engages the heater 18 and a portion that positively engages the nozzle subassembly 11 so that the heater 18 is axially positioned and retained on the nozzle subassembly 11. In this embodiment, retaining body 12 has a first flange 30 that protrudes inward and is configured to be received in a first circumferential groove 28 formed on the outside surface of the tip retainer 14. When heater 18 with attached retaining body 12 is slipped over nozzle subassembly 11, groove 28 will catch first flange 30 in positive engagement and will thereafter firmly retain heater 18 axially on nozzle subassembly 11. Preferably, first flange 30 is wider than groove 28 and has a radiused end 33 that allows flange 30 to slide in and out of groove 28 with manual force. Groove 28 thereby acts as a detent for first flange 30 as the retaining body 12 is slid along the nozzle subassembly 11. Alternatively, first flange 30 may be narrower than groove 28, thereby allowing deeper positive engagement of first flange 30 into groove 28 and requiring a tool to spread retaining body sufficiently at slot 26 to disengage first flange 30 from groove 28.

Except for first flange 30, the retaining body 12 is configured to slip over the outer diameter of heater 18. To retain the retaining body 12 on heater 18, retaining body 12 has a second flange 31 that protrudes inward and is configured to positively engage and be received in a second circumferential groove 34 formed in the heater 18 to thereby axially locate and mount retaining body 12 on heater 18. A tapered surface 40 may be advantageously provided on the retaining body 12 adjacent second flange 31 to ease installation of the retaining body 12 onto the heater 18. The tapered surface 40 is configured to assist the second flange 31 in sliding over a portion of the heater 18 before the second flange 31 positively engages the second groove 34 during installation of the retaining body 12 onto the heater 18.

Alternative arrangements to secure the retaining body 12 to the heater 18 may include the use of a set screw which is threaded through the retaining body 12 and is received in a hole or indent in the heater 18.

In a preferred embodiment, an axial slot 26 is formed in the retaining body 12 which allows the retaining body 12 to spread elastically outward to allow the retaining body 12 to fit over the nozzle subassembly 11 and the heater 18. As the retaining body 12 is slid over these parts, the retaining body will "snap" back to its original shape when the first flange 30 and second flange 31 become aligned with their respective first and second grooves 28 and 34. Preferably, the retaining body 12 is first installed onto the heater 18 such that second flange 31 is disposed in the second groove 34. Then the heater/retaining body assembly is slid onto the nozzle subassembly 11 until first flange 30 snaps into first groove 28. When the first flange 30 is wider than groove 28, the heater/retaining body assembly may be removed by manually pulling it axially to unseat first flange 30 from groove 28. Otherwise, a tool, such as a screwdriver, is used in slot 26 to pry the retaining body 12 open and facilitate removal. Slot 26 is preferably between about 1 2.5 mm wide to allow for the insertion of a typical screwdriver tip.

In the preferred embodiments illustrated, the retaining body 12 is made of stainless steel or an aluminum alloy with a hard anodized coating. In accordance with another preferred embodiment, the retaining body could be fabricated from a shape-memory alloy or bimetallic material such that as the retaining body 12 heats up, it tightens onto the nozzle thereby enhancing thermal communication between the heater/nozzle and the retaining body.

Formed in the retaining body 12 is at least one thermocouple aperture 13 configured to receive a thermocouple 15. A plurality of thermocouple apertures 13 may optionally be provided around the periphery of the retaining body 12 to provide multiple points of access for installation of the thermocouple 15, or to provide for installation of multiple thermocouples 15, preferably one thermocouple per aperture. Multiple thermocouples 15 in retaining body 12 provides redundancy in case one fails. Also, multiple thermocouples would allow for determining the circumferential thermal gradient of the injection nozzle assembly 10, which has been found to be 4–8 degrees Centigrade, and controlling the heater 18 based on the signal from whichever thermocouple allows the best operation of an injection molding machine to which nozzle assembly 10 is attached.

Thermocouple aperture 13 preferably is an elongated hole or channel running parallel to the longitudinal axis of retaining body 12, which is preferably coincident with longitudinal axis 35 of the injection molding nozzle subassembly 11. The aperture 13 is configured to receive and positively engage the thermocouple 15. Preferably thermocouple 15 is permanently retained in aperture 13 by local crimping of retaining body 12 at aperture 13. In a preferred embodiment, the depth of aperture 13 determines the axial location of thermocouple 115. Thus, it can be seen that by changing the depth of aperture 13, the axial location of thermocouple 13 may also be changed. Alternatively, thermocouple 15 may be mounted in a substrate (not shown) which is itself retained in aperture 13. The length of the substrate then determines the axial location of thermocouple 13. When multiple apertures 13 are provided in retaining body 12, each aperture 13 may have a unique depth, thereby allowing the axial location of the thermocouple 15 to be determined by selecting which aperture into which thermocouple 15 is installed.

Optionally, the aperture 13 may be configured to hold the thermocouple in direct contact with a surface of the heater 18. This would further reduce the thermal resistance between the heater 18 and the thermocouple 15.

Referring now to FIGS. 5 and 6, an alternative retaining collar 112 is disposed on an end of the heater 18. In this preferred embodiment, the thermocouple 15 is wrapped around the heater 18, and placed in a cavity 52 formed between a shoulder 50 in the heater 18 and a shoulder or surface 54 in the collar 112. Preferably, the slot 26 is provided which allows the collar 112 to flex and fit around the heater/thermocouple. In this way, the collar 112 provides a preload to maintain intimate contact between the thermocouple 15 and the heater 18. Preferably, the collar 112 is configured to be disposed adjacent a resistive element of the heater 18. The collar 112 may be made of aluminum or steel, and may have flanges similar to those shown in the previous embodiment for attaching collar 12 to heater 18 and to nozzle subassembly 11.

All of the embodiments of the present invention accurately retain the heater 18 on the nozzle subassembly 11. The use of a separate snap ring and threaded elements as in the prior art has been eliminated. In a preferred embodiment, a thermocouple 15, or other temperature sensor, is installed in the retaining body 12 and is thereby accurately positioned relative to the heater 18 and nozzle subassembly 11 which improves measuring and controlling the thermal management of the injection molding process, specifically at the injection molding nozzle assembly 10.

It will, of course, be understood that the above description has been given by way of example only and that modifications in detail may be made within the scope of the present invention as defined by the following claims. For example, while the retaining device has been illustrated and described for retaining a thick-film heater on an injection molding nozzle, it will be apparent to one skilled in the art that a retaining device of the present invention can also be used to retain other types of heaters on an injection molding nozzle, and also be used to retain any thin heater on any other substantially cylindrical device.

What is claimed is:

1. An injection molding nozzle heater retaining apparatus for retaining a heater on an injection molding nozzle subassembly, the apparatus comprising: a retaining body having an inside diameter configured to fit around an injection molding nozzle subassembly, the retaining body having a first flange and a second flange, both flanges extending inward, the first flange being configured to be received in a groove in an exterior surface of the injection molding nozzle subassembly, the second flange being configured to be received in a groove in the heater.

2. The apparatus of claim 1, wherein the retaining body has an axial slot allowing the retaining body to spread elastically outward.

3. The apparatus of claim 1, wherein the retaining body has a tapered surface adjacent the second flange, the tapered surface being configured to permit the retaining body to slide over the heater during installation of the retaining body onto the heater.

4. The apparatus of claim 1, wherein said retaining body is made of a material such that the retaining body tightens onto the injection molding nozzle as the injection molding nozzle heats.

5. The apparatus of claim 1, wherein the retaining body has at least one aperture configured to receive a thermocouple.

6. The apparatus of claim 5, wherein the at least one aperture is an elongated hole having an axis parallel to a longitudinal axis of the retaining body.

7. The apparatus of claim 6, wherein the at least one aperture is one of a plurality of such apertures in the retaining body.

8. The apparatus of claim 7, wherein each aperture has a unique depth.

9. The apparatus of claim 8, further comprising a thermocouple installed in one of the apertures to place the thermocouple at a desired location as determined by the depth of the aperture in which the thermocouple is installed.

10. The apparatus of claim 6, further comprising a thermocouple installed in the at least one aperture.

11. The apparatus of claim 7, further comprising a plurality of thermocouples installed in the apertures, one thermocouple per aperture.

12. An injection molding nozzle assembly comprising: a nozzle subassembly including a nozzle housing and a nozzle tip coupled to the nozzle housing; a heater disposed around the nozzle subassembly, in use, to heat the nozzle sub assembly; and a retaining body having a portion positively engaging the heater and a portion positively engaging the nozzle subassembly so that the heater is axially positioned and retained on the nozzle subassembly.

13. The nozzle of claim 12, wherein the retaining body has an axial slot allowing the retaining body to spread elastically outward.

14. The nozzle of claim 12, wherein the nozzle sub assembly has a first circumferential groove and the portion of the retaining body engaging the nozzle subassembly is a first flange extending inward, the first flange being received by the first groove.

15. The nozzle of claim 14, wherein the first flange is wider than the first groove, and the first flange has a radiused end so that the first groove acts as a detent for the first flange as the retaining body is slid along the tip retainer.

16. The nozzle of claim 14, wherein the nozzle subassembly has a removable tip retainer that retains the tip against the nozzle housing, and wherein the first circumferential groove is in the tip retainer.

17. The nozzle of claim 12, wherein the heater has a second circumferential groove and the portion of the retaining body engaging the heater is a second flange extending inward, the second flange being received by the second groove.

18. The nozzle of claim 17, wherein the retaining body has a tapered surface adjacent the second flange, the tapered surface being configured to assist the second flange in sliding over a portion of the heater before the second flange engages the second groove during installation of the retaining body onto the heater.

19. The nozzle of claim 12, wherein the heater is a thick-film heater.

20. The nozzle of claim 19, further comprising a thermocouple installed in the retaining body.

21. The nozzle of claim 20, wherein the thick-film heater has a plurality of resistive elements, and the thermocouple is installed adjacent one on the resistive elements.

22. The nozzle of claim 21, wherein the resistive elements produce different heat levels and wherein the thermocouple is installed adjacent the resistive element that produces the greatest heat.

23. The nozzle of claim 20, wherein of the retaining body has an elongated hole with an axis parallel to a longitudinal axis of the retaining body, and the thermocouple is installed therein.

24. The nozzle of claim 20, wherein the retaining body has a plurality of apertures disposed around the heater, each aperture being configured to receive a thermocouple.

25. The nozzle of claim 24, wherein a plurality of thermocouples are installed in the plurality of apertures.

* * * * *